(12) United States Patent
Griffin, Jr. et al.

(10) Patent No.: US 10,920,896 B2
(45) Date of Patent: Feb. 16, 2021

(54) TOP ENTRY AXIAL FLOW REGULATOR

(71) Applicant: EMERSON PROCESS MANAGEMENT REGULATOR TECHNOLOGIES, INC., McKinney, TX (US)

(72) Inventors: James L. Griffin, Jr., McKinney, TX (US); Daniel G. Roper, Lucas, TX (US); Douglas J. Scheffler, McKinney, TX (US); Harold J. Mckinney, Durant, OK (US); Matthew W. Hanusa, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 10 days.

(21) Appl. No.: 16/055,930

(22) Filed: Aug. 6, 2018

(65) Prior Publication Data

US 2018/0347718 A1 Dec. 6, 2018

Related U.S. Application Data

(62) Division of application No. 15/288,015, filed on Oct. 7, 2016, now Pat. No. 10,041,602.

(51) Int. Cl.
*F16K 27/02* (2006.01)
*F16K 1/12* (2006.01)
(Continued)

(52) U.S. Cl.
CPC .......... *F16K 27/0236* (2013.01); *F16K 1/123* (2013.01); *F16K 1/126* (2013.01);
(Continued)

(58) Field of Classification Search
CPC ...... F16K 27/0236; F16K 1/123; F16K 1/126; F16K 1/427; F16K 7/12; F16K 27/02; F16K 31/1262; G05D 16/0608
See application file for complete search history.

(56) References Cited

U.S. PATENT DOCUMENTS

| | | | |
|---|---|---|---|
| 3,253,608 A * | 5/1966 | Davis | F16K 1/123 137/220 |
| 3,456,674 A | 7/1969 | Buresh et al. | |

(Continued)

FOREIGN PATENT DOCUMENTS

DE 69 627 C 9/1892

OTHER PUBLICATIONS

Emerson Process Management; "Type EZH Pilot Operated Regulator (4 In. / DN 100)," Oct. 2015.
(Continued)

*Primary Examiner* — Kevin R Barss
(74) *Attorney, Agent, or Firm* — Marshall, Gerstein & Borun LLP

(57) ABSTRACT

A valve seat assembly for use in a fluid control valve. The valve seat assembly includes a pad holder and a support ring. The pad holder includes a support body configured to support a seat pad and a plurality of alignment struts projecting radially outwardly from the support body. The support ring extends around the radially outer perimeter of the alignment struts. The pad holder slides into and out of an operative position in the support ring.

18 Claims, 8 Drawing Sheets

(51) Int. Cl.
*F16K 1/42* (2006.01)
*F16K 31/126* (2006.01)
*F16K 7/12* (2006.01)
*G05D 16/06* (2006.01)
*G05D 7/01* (2006.01)

(52) U.S. Cl.
CPC ............... *F16K 1/427* (2013.01); *F16K 7/12* (2013.01); *F16K 27/02* (2013.01); *F16K 31/1262* (2013.01); *G05D 7/0106* (2013.01); *G05D 16/0608* (2013.01)

(56) References Cited

U.S. PATENT DOCUMENTS

| | | | | |
|---|---|---|---|---|
| 4,137,933 | A * | 2/1979 | Culpepper | F16K 1/123 137/219 |
| 5,076,317 | A | 12/1991 | DeWire et al. | |
| 5,826,613 | A * | 10/1998 | Schalk | F16K 1/123 137/219 |
| 6,412,750 | B1 | 7/2002 | Jun et al. | |
| 7,066,447 | B2 * | 6/2006 | McCarty | F16K 1/123 137/271 |
| 7,186,097 | B1 | 3/2007 | Blume | |
| 8,672,295 | B2 | 3/2014 | Dhawan et al. | |
| 8,746,658 | B2 * | 6/2014 | Gauss | F16K 31/047 251/129.12 |
| 10,041,602 | B2 * | 8/2018 | Griffin, Jr. | F16K 31/1262 |
| 2001/0011715 | A1 | 8/2001 | Roth et al. | |
| 2004/0035462 | A1 * | 2/2004 | McCarty | F16K 1/123 137/219 |
| 2004/0183044 | A1 * | 9/2004 | Wears | F16K 1/123 251/206 |
| 2014/0054477 | A1 * | 2/2014 | Schade | F16K 31/54 251/61.1 |
| 2015/0226337 | A1 | 8/2015 | McHugh | |
| 2015/0330517 | A1 | 11/2015 | Lin et al. | |
| 2016/0266346 | A1 * | 9/2016 | Klaffert | G02B 7/182 |

OTHER PUBLICATIONS

Emerson Process Management; "Type FL with Type 32A Pilot," May 2011.
Communication Relating to the Results of the Partial International Search for PCT/US2017/052373, dated Dec. 5, 2017.
Search Report for PCT/US2017/052373, dated Apr. 26, 2018.
Written Opinion for PCT/2017/052373, dated Apr. 26, 2018.

* cited by examiner

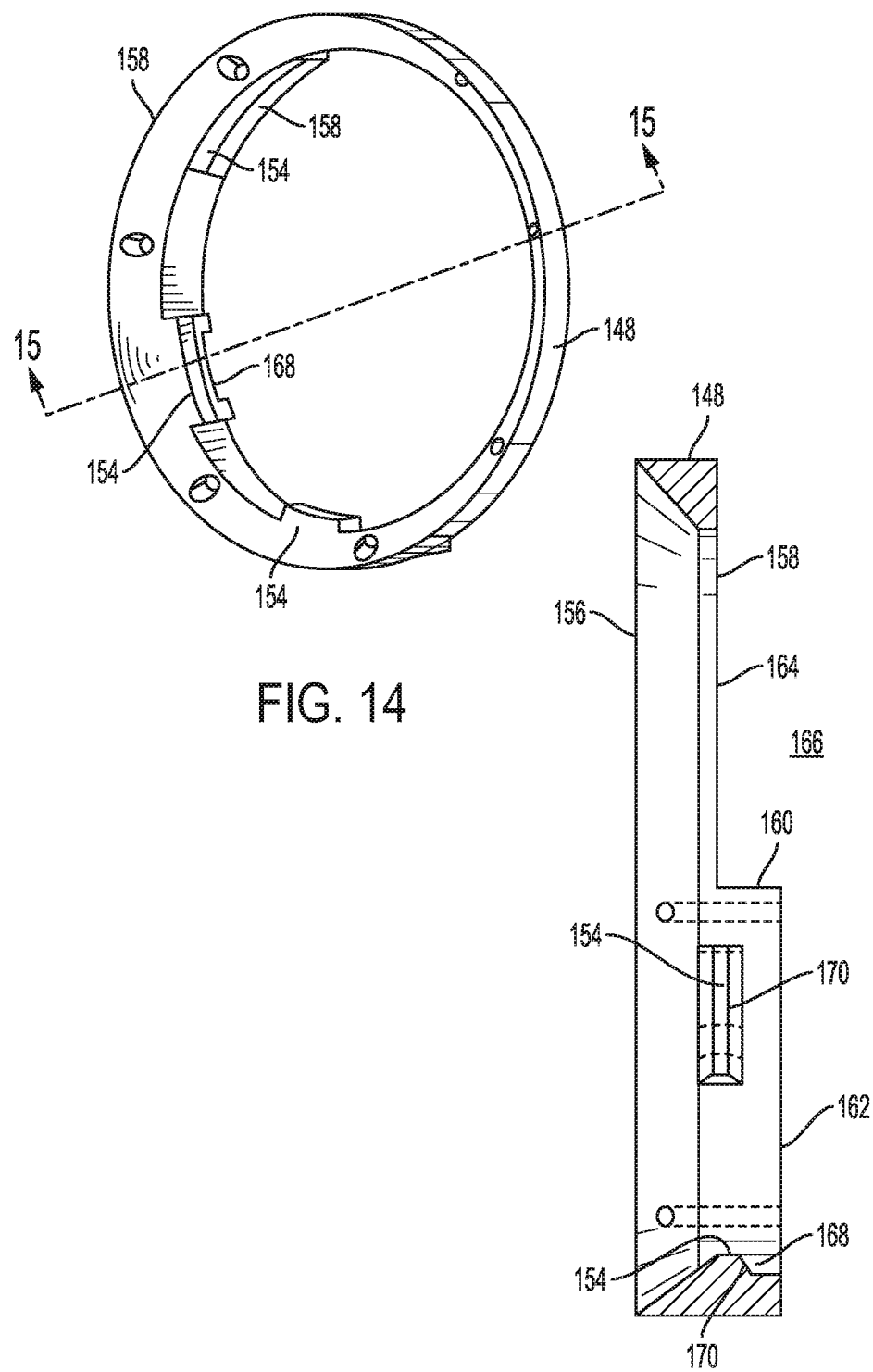

TOP ENTRY AXIAL FLOW REGULATOR

FIELD

This application relates generally to flow regulators, and more particularly, to an axial flow regulator with a top entry trim installation arrangement.

BACKGROUND

FIG. 1 illustrates a typical top entry regulator, which has a valve body 10 defining a fluid flow path extending from an inlet 11 to an outlet 12 extending generally along the horizontal axis and valve trim opening 13 that extends laterally upwardly from the fluid flow path through a top side of the valve body. An actuator 14 is attached to the top side of the valve body over the valve trim opening 13 and configured to move a valve sleeve 15 up and down in the valve trim opening 13 so as to regulate the flow of fluid. A benefit of a top entry regulator such as this is that the regulator and the valve trim can be disassembled and removed from the valve body 10 without having to remove or uncouple the valve body from the pipes at the inlet 11 and the outlet 12. However, the circuitous route of the fluid flow path through the valve trim can reduce the flow efficiency of the valve.

FIG. 2 illustrates a typical axial flow regulator, which has an inlet flange 20, an inlet cover 21, an outlet cover 22, and an outlet flange 23, which are bolted together in-line with each other to form a fluid flow passage extending along a generally horizontal central axis extending from an inlet 24 in the inlet flange 20 to an outlet 25 in the outlet flange 23. A diaphragm 28 is clamped between the inlet cover 21 and the outlet cover 20 so as to form an actuator attached in-line along the horizontal central axis between the inlet flange 20 and the outlet flange 23. The actuator is configured to move a valve sleeve 26 that is axially aligned with, and moves back and forth along the horizontal central axis relative to a valve seat assembly 27. An advantage of such an axial flow regulator is that it typically has improved flow efficiency as compared with the top entry regulator because of the less circuitous route of the fluid through the valve trim. However, in order to access the valve seat assembly 27, for example for maintenance, it is typically necessary to remove the outlet flange 23 completely. This may require extensive labor and/or specialized tools to uncouple the actual flow regulator from one or both of the pipes connected to the inlet flange 20 and the outlet flange 23.

SUMMARY

According to some aspects of the present disclosure, an axial flow regulator includes a lateral access port through a portion of the valve body that provides access to a valve seat assembly and/or other portions of the valve trim without having to remove or uncouple the outlet flange or the inlet flange from the adjacent pipe sections. In this way, the flow efficiency benefits of an axial flow regulator may be realized while simultaneously reducing the difficulties associated with installing and/or removing some or all portions of the valve trim from an axial flow regulator.

According to some aspects of the present disclosure, the lateral access port extends through an outlet flange portion of the valve body. The lateral access port may be configured to allow a valve seat assembly to be laterally inserted into and removed from the outlet flange. In this way, the valve seat assembly can be accessed and removed and installed without separating the outlet flange from the adjacent portions of the regulator or the adjacent pipeline.

According to some aspects of the present disclosure, a valve seat assembly includes a pad holder and a support ring for the pad holder that is separable from the pad holder. The pad holder may be configured to slide into the support ring laterally through a cutaway portion of the support ring. The support ring may be configured to be attached to the inner surface of a valve body, for example with fasteners. The valve seat assembly may be configured for use in an axial flow regulator. However, the valve seat assembly is not limited to use in an axial flow regulator, but rather may be configured for use in other types of fluid control valves as well.

According to some aspects of the present disclosure, a pad holder of a valve seat assembly includes alignment struts projecting radially outwardly from a pad support body. The distal ends of the alignment struts are preferably not interconnected by an integral outer support ring. Rather, the distal end of each alignment strut is preferably configured to be slidingly received within a respective strut receiver. In this way, the pad holder may be removed from a valve trim separately from the support ring. The pad holder may be configured for use in an axial flow regulator and/or in other types of fluid control valves.

According to some aspects of the present disclosure, a support ring for a pad holder defines a strut receiver and a radial cutaway portion, such as a slot or stepped portion, radially opposite the strut receiver, through which the pad holder can slide into strut receiver along a plane defined by the support ring. In this way, the support ring may allow the pad holder to be inserted and removed from the axial flow regulator through the lateral access port. The support ring may be configured for use in an axial flow regulator and/or in other types of fluid control valves.

According to some aspects of the present disclosure, a port cover for sealingly covering the lateral access port includes a strut receiver, such as a groove or socket, that receives a portion of the pad holder when operatively closed over the lateral access port. In this way, the port cover can help maintain the pad holder in an operative position in the valve body.

According to some aspects of the present disclosure, the port cover may be coupled to the valve body with a hinge. In this way, the access port may be opened without completely removing the port cover from the valve body. According to other aspects of the present disclosure, the port cover may be completely removable from the valve body.

According to some aspects of the present disclosure, one or more of the strut receivers may receive a distal end of a radial alignment strut of the pad holder and prevents the pad holder from rotating axially with respect to the support ring and/or the port cover and/or the valve body. The strut receiver may include circumferentially spaced apart receiver sockets and/or grooves and/or portions thereof that receive distal ends of alignment struts of the support pad and that prevent the pad holder from rotating about the axis of the support ring.

According to some aspects of the present disclosure, one or more of the strut receivers has a tapered wall to form a wedge-shaped receiver such that the distal ends of the alignment struts are wedged into the strut receivers. In this way, movement of the pad holder within the strut receivers is prevented without requiring additional fasteners, such as bolts through the alignment struts.

Any one or more of these aspects may be considered separately and/or combined with each other in any functionally appropriate manner. In addition, Any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

FIG. 14 is a perspective view of a support ring of the valve seat assembly;

FIG. 15 is a cross-section view of the support ring along the lines 15-15 of FIG. 14.

DETAILED DESCRIPTION

Figure 1:
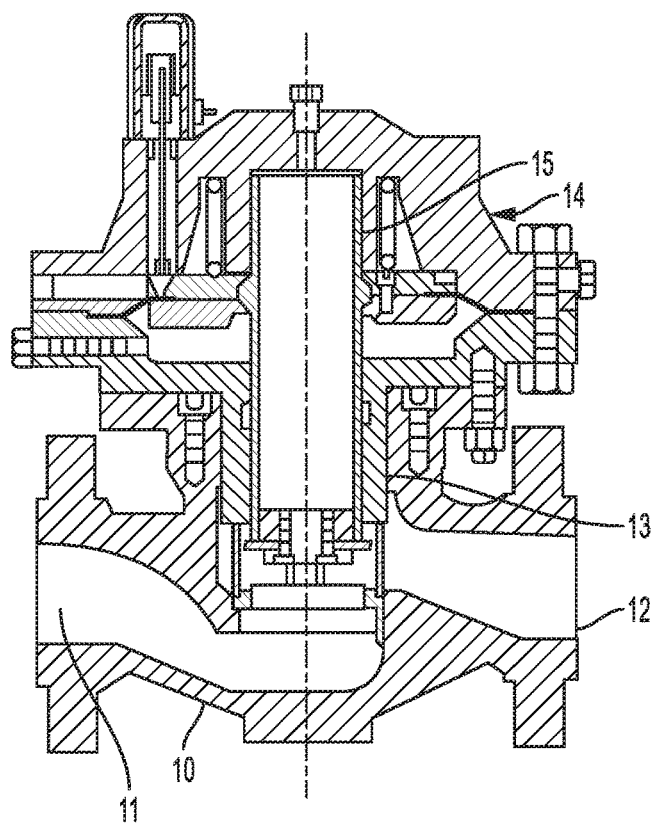
FIG. 1 is a cross-sectional view of a top entry regulator according to the prior art.

Before describing the specific examples shown in the drawings, some general arrangements and features are provided.

In some arrangements, an axial flow regulator includes a valve body defining a fluid flow path along an axis therethrough from an inlet to an outlet, a valve trim disposed in an operative position along the fluid flow path inside the valve body configured to control the flow of fluid along the fluid flow path, and a lateral access port through a portion of the valve body. The lateral access port allows access to portions of the valve trim laterally through the valve body, and portions of the valve trim can be removed from or inserted into the valve body through the lateral access port.

In some arrangements, a valve seat assembly of a fluid control valve, includes a pad holder and a support ring. The pad holder includes a support body configured to support a seat pad and a plurality of alignment struts projecting radially outwardly from the support body. The support ring extends around the radially outer perimeter of the alignment struts. The pad holder slides into and/or out of an operative position in the support ring.

In some arrangements, a pad holder for a valve seat assembly includes a pad support body having an end face configured to support a valve pad and an opposite end and a plurality of alignment struts projecting radially outwardly from the opposite end of the pad support body. Distal ends of the respective alignment struts are configured to be slidingly received within and/or removed from corresponding strut receivers.

In some arrangements, a support ring for a valve seat assembly includes an upper portion and a lower portion, a strut receiver disposed on a radially inner surface of the lower portion, and a cutaway portion defined by the upper portion, wherein the cutaway portion is radially opposite the strut receiver.

In some arrangements, an axial flow regulator includes a valve seat assembly as described herein. The valve seat assembly is operatively installed within the axial flow regulator to control the flow of fluid through the axial flow regulator. The axial flow regulator may include a valve body that defines a fluid flow path extending along an axis through the valve body from an inlet to an outlet. The valve seat assembly may be operatively installed in the fluid flow path. A lateral access port may extend through a radial wall of the valve body radially aligned with at least a portion of the valve seat assembly.

Any one or more of these arrangements may optionally include any one or more of the following features.

The valve trim may include a valve sleeve and a valve seat assembly. The valve sleeve and the valve seat assembly may be aligned along the axis through the valve body. The valve sleeve may be configured to open and close with axial movement along the axis toward and away from the valve seat assembly.

The lateral access port may extend through a radial side wall of an outlet flange portion of the valve body or another portion of the valve body. The valve seat assembly and the lateral access port may be located at least partially in a single lateral plane relative to the axes through the valve body. Preferably, at least a portion of the valve seat assembly may be removed from and/or inserted into the operative position through the lateral access port.

A port cover may be provided that covers the lateral access port. The port cover may be removable from the valve body. An interior surface of the port cover may include a receiver recess that receives at least a portion of the valve seat assembly and retains the valve seat assembly in the operative position. The port cover may be connected to the valve body with a hinge configured such that the port cover can be swung open and closed over the lateral access port.

The support ring may be configured to be attached to the inner circumferential surface of the valve body. The support ring may include one or more strut receivers. A distal end of one of the alignment struts may be slidably received within the strut receiver in the operative position in the support ring. The support ring may form an axially cutaway portion radially opposite the one or more strut receivers. The pad holder may be able to slide through the axially cutaway portion into and/or out of the operative position in the support ring. The support ring may include a front face and a rear face, wherein the front face is disposed in a single radial plane, and the rear face has a stepped configuration between the upper portion and the lower portion. The upper portion may have a first thickness between the front face and the rear face. The lower portion may have a second thickness between the front face and the rear face. The second thickness of the lower portion may be greater than the first thickness of the upper portion. The one or more strut receivers may be disposed on a radially inner surface of the lower portion. The cutaway portion may be in the same radial plane as the one or more strut receivers. One or more of the strut receivers may include a receiver socket, for example recessed into a rear axial wall of the receiver socket, or may have a flat rear wall that does not form a socket. The rear axial wall may be tapered to form a wedge-shaped receiver cavity for a distal end of an alignment strut.

The alignment struts may define a plurality of flow-through passages extending through the valve seat assembly between the support ring and the support body of the pad holder. The distal ends of the alignment struts are preferably not interconnected by an integral outer support ring.

Figure 3:
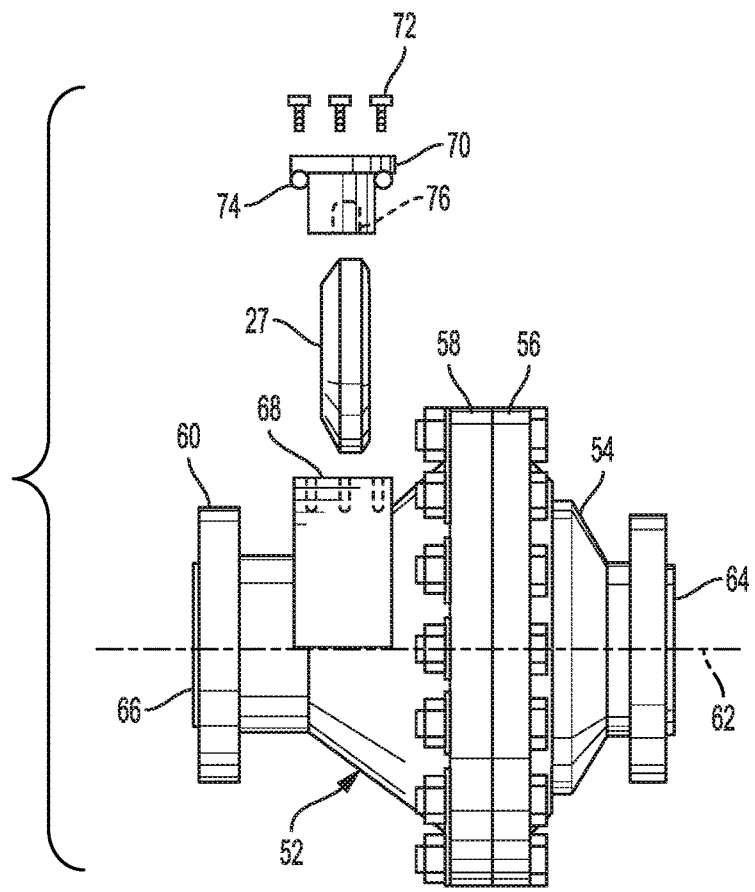
FIG. 3 is a side elevation exploded view of a top entry axial flow regulator according to the present disclosure.
Figure 4:
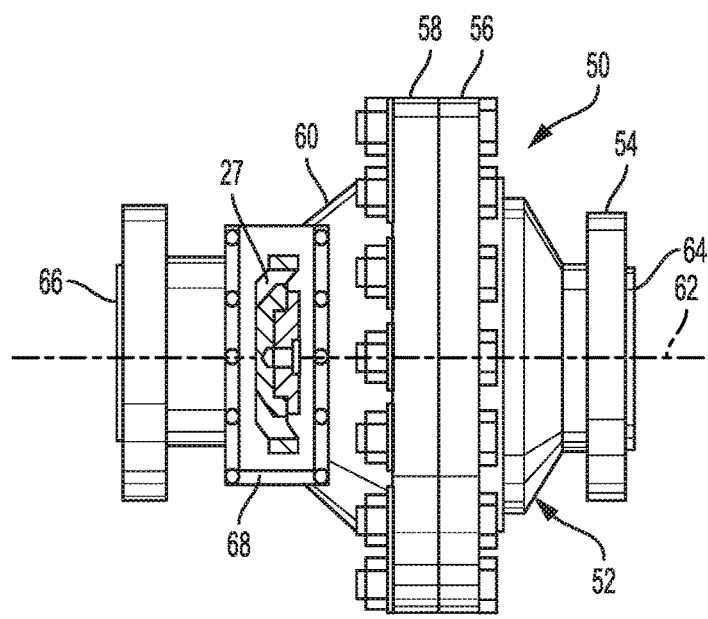
FIG. 4 is a front side elevation view of the top entry axial flow regulator of FIG. 3.
Figure 5:
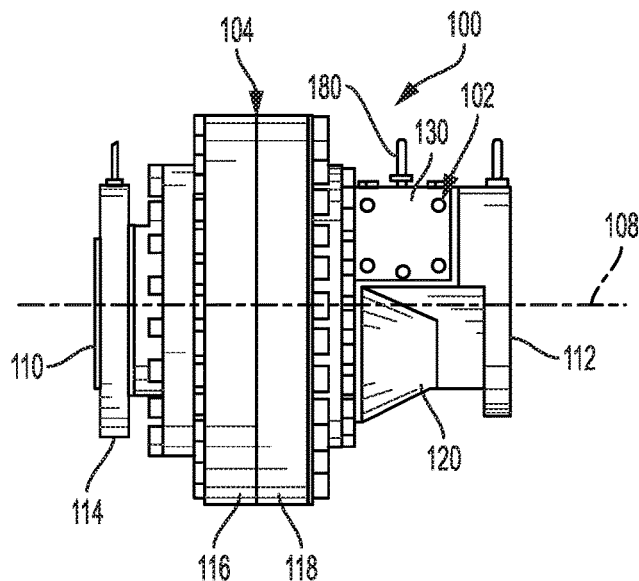
FIG. 5 is a side elevation view of another top entry axial flow regulator according to the present disclosure.
Figure 6:
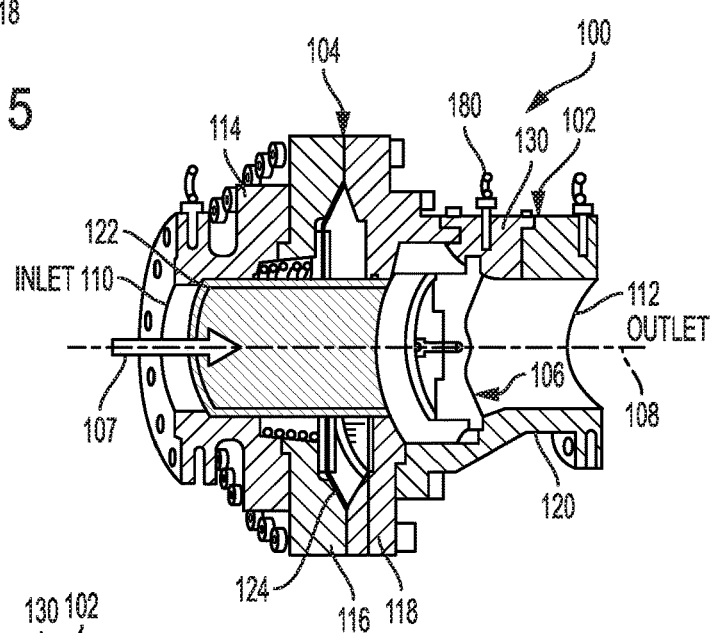
FIG. 6 is a perspective axial cross-section view of the top entry axial flow regulator of FIG. 5 with a valve seat assembly according to the present disclosure installed and the valve sleeve in an open position.
Figure 7:
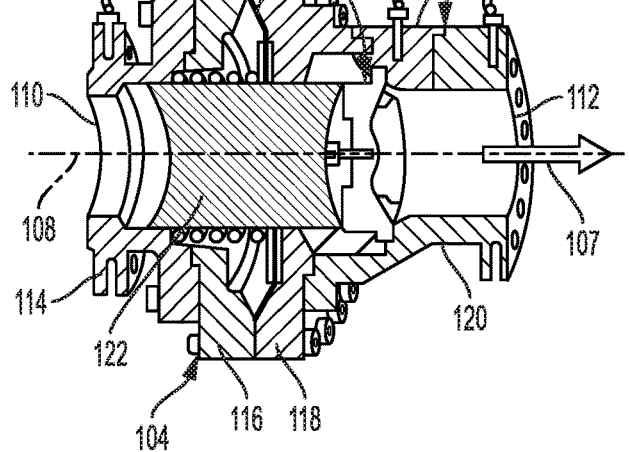
FIG. 7 is a perspective axial cross-section view of the top entry axial flow regulator of FIG. 5 with the valve seat assembly and the valve sleeve in a closed position.

Turning now to the exemplary arrangements of the drawings, FIGS. 3 and 4 show a top entry axial flow regulator 50 according to some exemplary aspects of the disclosure. A valve body 52 includes a lateral access port 68, which defines an opening that provides access to internal portions of the regulator 50 without having to remove the regulator from an installed position in line between two adjacent pipe ends. The regulator 50 is called a "top entry" axial flow regulator because the regulator 50 may typically be installed in-line between opposing pipes and/or process equipment with the lateral access port 68 pointed upwardly. However, the regulator 50 does not have to be installed in this manner, but rather could be installed with the lateral access port 68 pointed in any convenient direction. Thus, the term "top entry" is not in any way meant to be limiting of the orientation of the regulator 50 or in the manner of installing the regulator 50 along a process control pipeline.

Figure 2:
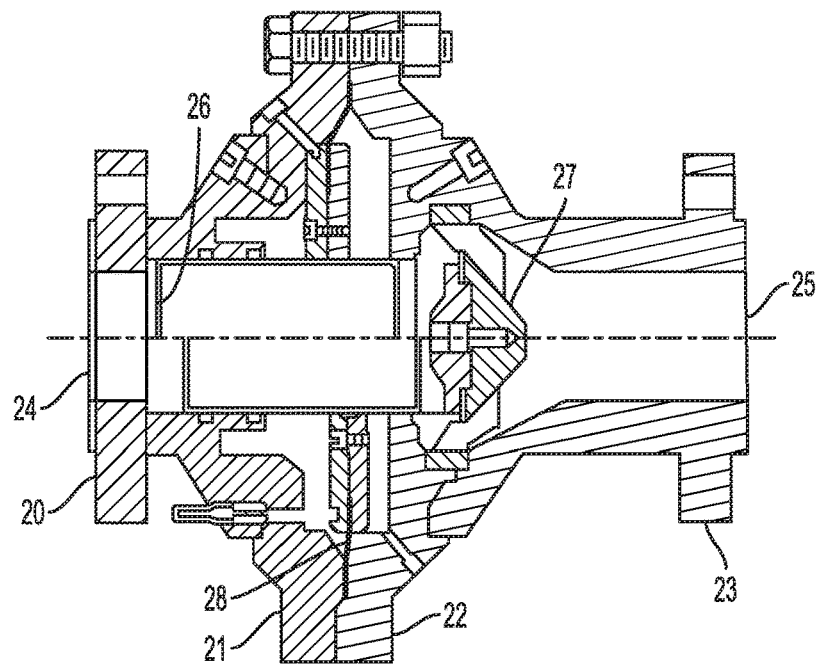
FIG. 2 is a cross-sectional view of an axial flow regulator according to the prior art.

The valve body 52 is formed by an inlet flange 54, an inlet cover 56, and outlet cover 58, and an outlet flange 60. The valve body 52 defines an axial fluid flow path extending along an axis 62 from an inlet 64 in the inlet flange 54 to an outlet 66 in the outlet flange 56. The inlet flange 54 is attached to the inlet cover 56, for example with bolts. The inlet cover 56 is attached to the outlet cover 58, for example with bolts. The outlet flange 60 is attached to the outlet cover 58, for example with bolts. However, the valve body 52 is not limited to this particular arrangement, and could be formed of more or fewer parts. In a similar manner as described with respect to the axial flow regulator of FIG. 2, a valve sleeve 26 (not visible) is configured to travel back and forth along the axis 62 of the fluid flow path to control the flow of fluid along the fluid flow path, and a flexible diaphragm 28 (not visible) is clamped between the inlet cover 56 and the outlet cover 58, thereby forming an in-line actuator with the flexible diaphragm 28 disposed transverse to the axis 62 between the inlet flange 54 and the outlet flange 60 and operatively connected to the valve sleeve 26 to move the valve sleeve axially.

The lateral access port 68 extends laterally (i.e., radially outwardly from the axis 62) through a radial side wall of the valve body 52. In this example, the lateral access port 68 extends through the radial side wall of the outlet flange 60 and is configured to provide access into internal portions of the regulator 50 laterally through the side wall of the valve body 52. However, the lateral access port 68 could be located in other portions of the valve body and/or be configured to provide access to other portions of the valve trim inside the valve body. The lateral access port 68 is configured to allow a valve seat assembly, such as the valve seat assembly 27 of FIG. 2 or other valve seat assemblies described herein, to be inserted and/or removed from its operative installed position within the axial flow regulator 50. Preferably, the lateral access port 68 forms an opening at least as wide as the outer diameter of the valve seat assembly 27 so that the valve seat assembly 27 can be inserted laterally through the sidewall the outlet flange 60 into its operative installed position. For example, the lateral access port 68 may form an opening that spans across at least the entire inner diameter of the outlet flange 60 and/or extends laterally into the valve body at least the radius of the fluid flow path.

A port cover 70 covers the lateral access port 68. The port cover 70 is removably attached to the outlet flange 60, for example with fasteners 72, such as bolts, screws, or bayonet connectors. In this way, the port cover 70 may be readily attached to and/or removed from outlet flange 60 when it is desired to install and/or remove the valve seat assembly 27. Preferably, the port cover 70 seals the opening through the lateral access port 68, for example with a seal 74, such as a gasket, O-ring, or other seal. In other arrangements, however, the port cover 70 may be hingedly attached to the valve body 52, as described hereinafter.

A receiver recess 76 is formed on an interior surface of the port cover 70. The receiver recess 76 is configured to receive one or more portions of the valve seat assembly 27 when the valve seat assembly 27 is operatively installed in the valve body 52 and the port cover 70 is operatively attached to the outlet flange 60 in order to cover the lateral access port 68. In this way, the port cover 70 also helps retain the valve seat assembly 27 both axially and laterally in its operative position inside the valve body 52. The receiver recess 76 may have different shapes and forms, such as a groove, socket, or other shape, sufficient to receive a portion of a valve seat assembly as described herein.

The top entry axial flow regulator 50 allows for relatively easy access to internal portions of the valve trim of the regulator, such as the valve seat assembly, while the regulator 50 is operatively installed along a pipeline or other process control line. For example, if it is desired to access and/or perform maintenance on the valve seat assembly, the port cover 70 can be removed from the outlet flange 60 after removal of the fastener 72, which exposes the opening and the valve seat assembly laterally through the radial side wall of the outlet flange 60. The valve seat assembly may be slid laterally out of the outlet flange 60 through the lateral access port 68, for example for cleaning, maintenance, and/or replacement. Thereafter, the same or a new valve seat assembly may be slid back into the outlet flange 60 through the lateral access port 68 and seated in its operative position within the valve body 52. The port cover 70 may then be installed over the opening of the lateral access port 68, and the fastener 72 may be re-fastened, thereby re-sealing the lateral access port 68 for further operation. In contrast to the axial regulator of FIG. 2, all of these steps can be performed without having to either remove the entire regulator from the adjacent pipes and/or equipment or to disassemble the regulator body 52, such as by un-bolting the outlet flange 60 from the outlet cover 58. Therefore, in axial regulator with a top access port, such as the lateral access port 68, allows for a much easier maintenance of internal portions of the regulator 50.

FIGS. 5-8 show another top entry axial flow regulator 100 according to some exemplary aspects with a lateral access port 102 through a radial side wall of the valve body 104 generally in accordance with the principles already described previously. As with the regulator 50, the regulator 100 also allows for easy access to and removal and installation of valve trim components, including a valve seat assembly 106, but with certain additional features as described hereinafter.

The valve body 104 defines an axial fluid flow path 107 extending along an axis 108 from an inlet 110 to an outlet 112. In this arrangement, the valve body 104 is formed by an inlet flange 114, an inlet cover 116, and outlet cover 118, and an outlet flange 120, fastened together in a similar manner as described with respect to the axial flow regulator of FIG. 2. However, the valve body 104 is not limited to this particular arrangement, and could be formed of more or fewer parts. Also similar to the axial flow regulator of FIG. 2, a valve sleeve 122 is disposed in the fluid flow path 107 and configured to travel back and forth along the axis 108 to control the flow of fluid along the fluid flow path. A flexible diaphragm 124 is clamped between the inlet cover 116 and the outlet cover 118, thereby forming an in-line actuator with the flexible diaphragm 124 disposed transverse to the axis 108 between the inlet flange 114 and the outlet flange 120. In this arrangement, the valve sleeve 122 is in the form of an open ended hollow cylindrical tube operatively connected to the flexible diaphragm 124 that guides fluid therethrough from the inlet 110 through the actuator portion of the regulator.

The lateral access port 102 forms an opening through a radial side wall of the outlet flange 120 and provides access to the valve seat assembly 106 through the side wall of the outlet flange 120. A port cover 130 is configured to be removably attached to the outlet flange 120 in order to sealingly close the opening of the lateral access port. Similarly as with the regulator 50, portions of the valve seat assembly 106 can be accessed and removed and/or reinstalled through the lateral access port 102 when the port cover 130 is removed from the lateral access port 102 without needing to disassemble the valve body 104 or remove the regulator 100 from the adjacent pipes or process control equipment. However, as explained hereinafter, the valve seat assembly 106 and the port cover 130 are different than the valve seat assembly 27 and port cover 70 described previously.

Figure 9:
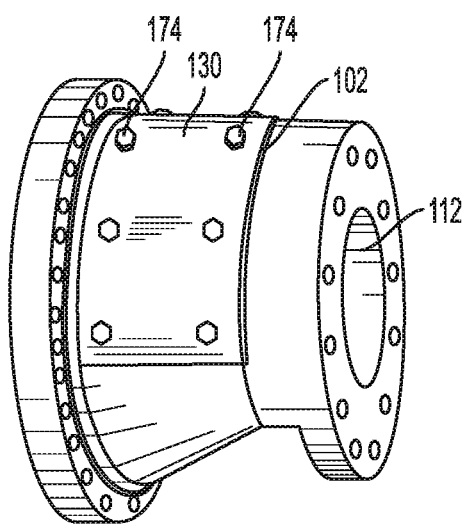
FIG. 9 is a side perspective view of the outlet flange of the top entry axial flow regulator of FIG. 5 in isolation from the remaining portions of the regulator and with a port cover with a different pattern.
Figure 10:
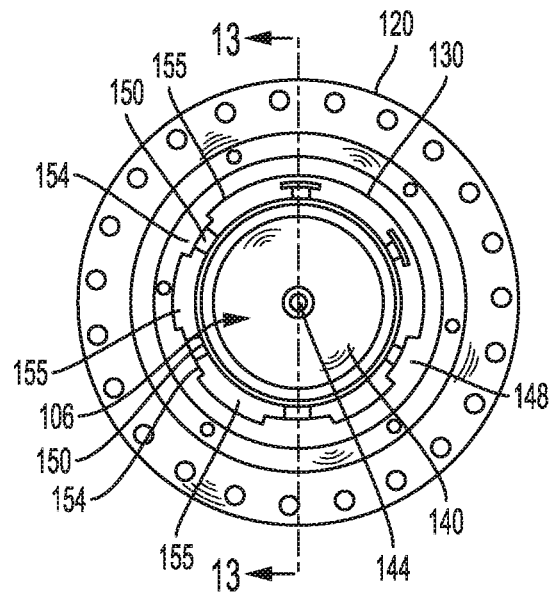
FIG. 10 is an end view of the outlet flange with a valve seat assembly installed.
Figure 11:
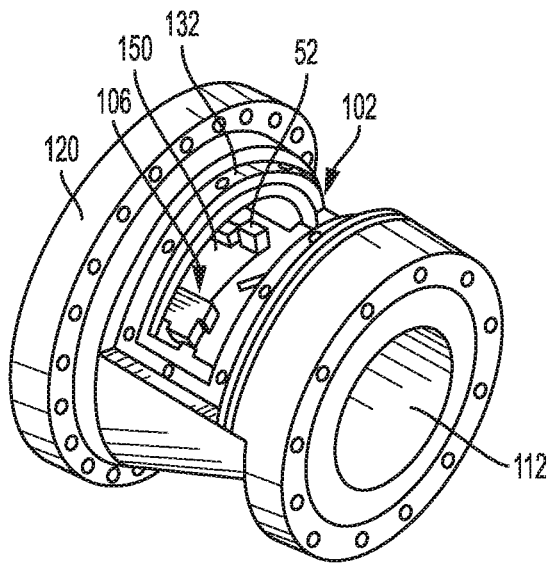
FIG. 11 is a top perspective view of the outlet flange with the port cover removed to show the valve seat assembly installed in the outlet flange.
Figure 12:
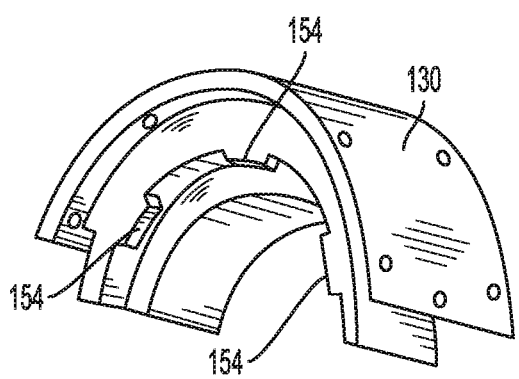
FIG. 12 is a perspective view of the port cover in isolation.

FIGS. 9-11 illustrate the outlet flange 120 with the valve seat assembly 106 operatively installed therein in isolation from the remaining portions of the regulator valve 100 for further clarity. FIG. 9 shows the port cover 130 operatively attached to the outlet flange 120 to close and seal the opening of the lateral access port 102. FIG. 10 shows and end view of the valve seat assembly 106 operatively installed in the outlet flange 120. FIG. 11 shows the outlet flange 120 with the port cover 130 removed from the lateral access port 102 and the valve seat assembly 106 visible and accessible through the lateral access port 102. A seal 132, such as a gasket, is also visible in the lateral access port 102 to form a liquid tight seal between the body of the outlet flange 120 and the port cover 130.

Figure 8:
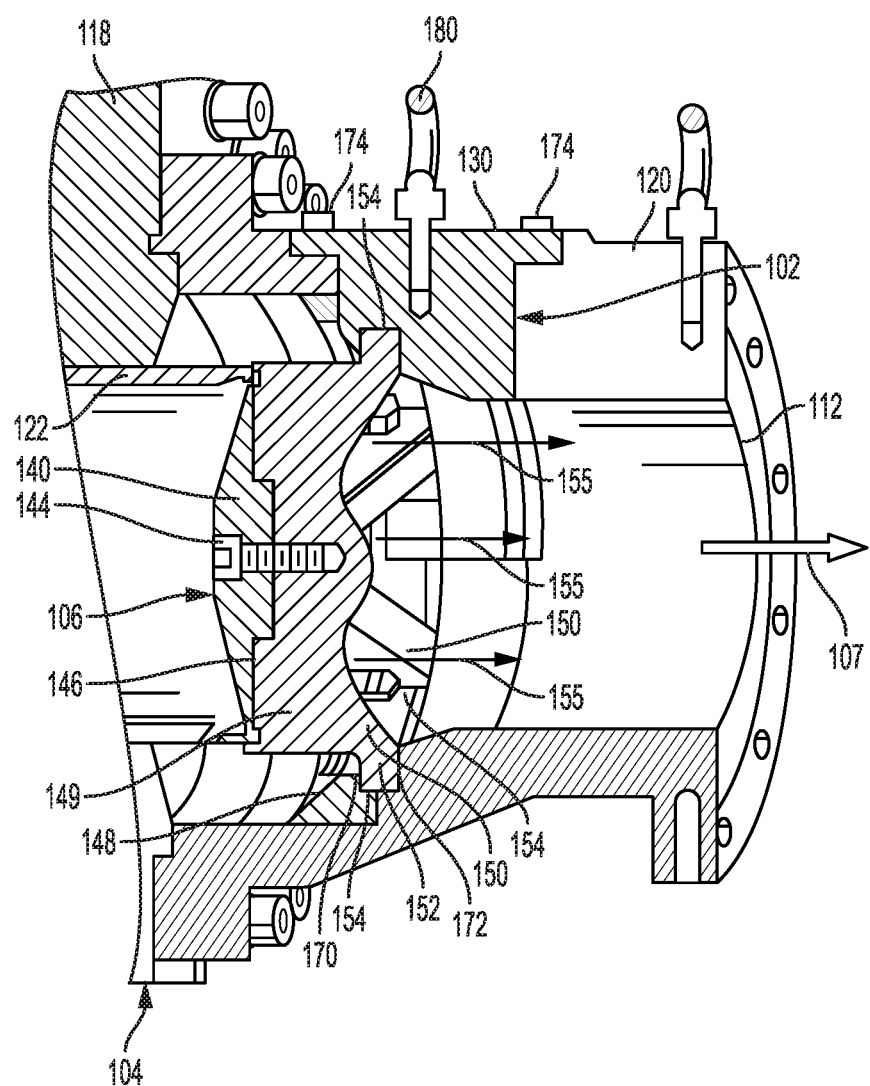
FIG. 8 is an enlarged detail view of the valve seat assembly shown in FIG. 7.
Figure 13:
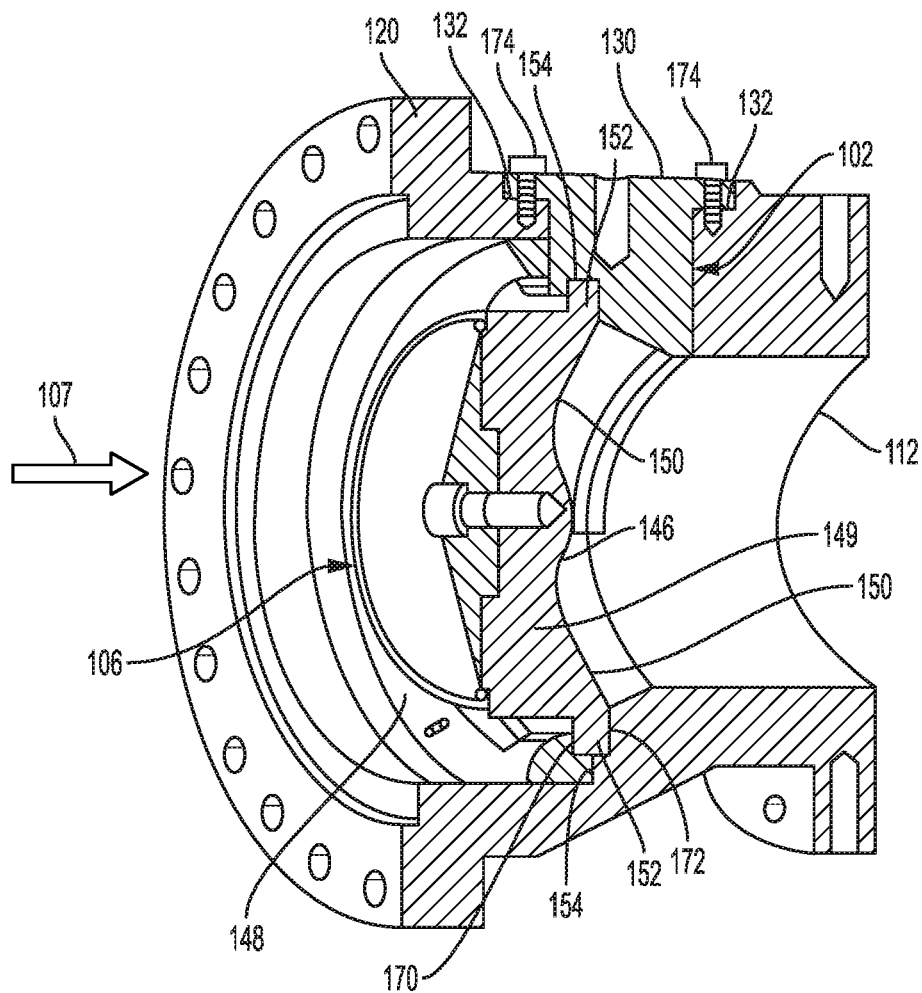
FIG. 13 is a perspective axial cross-section view of the outlet flange along the lines 13-13 of FIG. 10 showing the valve seat assembly installed in the outlet flange.

As best seen in the enlarged views of FIGS. 8 and 13, the valve seat assembly 106 includes a valve pad 140 that is attached to the end face of a pad support. The valve pad 140 is attached with a fastener 144, such as a screw or bolt, but may be attached with other mechanisms. Unlike the valve seat assembly 27, however, the pad support is not formed of a single piece, but rather is formed of two separable pieces: namely, a pad holder 146 to which the valve pad 140 is secured, and a support ring 148 that supports the outer periphery of the pad holder 146. In particular, the support ring 148 is configured to be secured to the inner radial surface of the outlet flange 120, for example with bolts or screws, and the pad holder 146 is configured to slide into the support ring 148 laterally through a cutaway portion of the support ring, as described in more detail hereinafter. In this way, the pad holder 146 can be removed through the lateral access port 102 without removing the support ring 148 from the inner radial surface of the outlet flange 120.

The pad holder 146 includes a pad support body 149 and a plurality of alignment struts 150 projecting radially outwardly from the centrally disposed pad support body 149. The valve pad 140 is secured to a front end face of the pad support body 149 with the fastener 144, and the alignment struts 150 extend radially outwardly from the rear end of the pad support body 149. Unlike previously known valve seat assemblies for axial regulators, however, the pad holder 146 does not include an integrally formed radially outer support ring that interconnects distal ends 152 of the alignment struts 150. Rather, the distal ends 152 of the alignment struts 150 are configured to be slidingly received within and removed from corresponding strut receivers 154 that are formed by the support ring 148, the interior surface of the outlet flange 120, and/or the interior surface of the port cover 130. In other words, the alignment struts 150 form finger-like projections that extend radially outwardly from the pad support body 149, like the hub and spokes of a wheel without the outer circumferential rim.

As best seen in FIGS. 8 and 10, the alignment struts 150 define a plurality of flow-through passages 155 through the valve seat assembly between the support ring 148 and the pad support body 149 around the outer periphery of the support body 149 when the support ring 148 and the pad holder 146 are assembled in an operative position.

As best seen in FIGS. 14 and 15, the support ring 148 has a front face 156 and a rear face 158. The front face 156 is disposed in a single radial plane. The rear face 158, however, has a stepped configuration between two separate radial planes, as best seen in FIG. 15. In particular, an axial (e.g., horizontal) step 160 is formed at the transition between a lower (as viewed in the figures) portion 162 of the support ring 148, which has a thicker dimension between the front face 156 and the rear face 158, and an upper portion 164 of the support ring 148, which has a thinner dimension between the front face 156 and the rear face 158. One or more of the strut receivers 154 are disposed on the radially inner surface of the lower portion 162 of the support ring 148 and aligned to engage the distal ends 152 of corresponding ones of the alignment struts 150 (as best seen in FIGS. 8 and 13). In this arrangement, the support ring 148 has three strut receivers 154 on the lower portion 162. However, fewer or more strut receivers 154 may be provided. The stepped configuration of the rear face 158 forms an axially cutaway portion 166 radially opposite the strut receivers 154. The radially cutaway portion 166 is in the same radial plane as the strut receivers 154.

As best seen in FIGS. 6-8 and 13, the support ring 148 is operatively installed to the interior surface of the outlet flange 120 with fasteners, such as bolts or screws extending axially through the lower portion 162 and threaded into corresponding threaded axial screw sockets in the bottom portion of the outlet flange 120. In its operatively installed configuration, the support ring 148 extends around an inner circumferential surface of the outlet flange 120 with the rear plane of the upper portion 164 axially aligned with a front edge of the opening defined by the lateral access port 102 such that the radially cutaway portion 166 of the support ring 148 is axially aligned with the opening formed by the lateral access port 102. In this way, when the port cover 130 is removed, the pad holder 146 can slide down into the strut receivers 154 of the lower portion 162 of the support ring 148 along the plane of the cutaway portion 166.

As best seen in FIGS. 8, 13, and 15, the rear axial wall 170 of each strut receiver 154 is tapered axially, which forms a wedge-shaped surface for receiving the distal ends 152 of the alignment struts 150 such that they will wedge into the strut receiver. In particular, when the support ring 148 is operatively installed on the interior surface of the outlet flange 120, the rear axial walls 170 face and are spaced apart from an opposing radial wall or walls 172 on the interior surface of the outlet flange 120, thereby forming a wedge-shaped recess, such as a groove or a socket, that receives the distal ends 152 of the alignment struts 150 on the lower portion of the pad holder 146. In a similar manner, the receiver sockets 154 in the port cover 130, which receive the distal ends 152 of the alignment struts 150 on the upper portion of the pad holder 146, may also be wedge-shaped. When the pad holder 146 is installed into the wedge-shaped strut receivers 154 formed along the lower portion of the support ring 148, the port cover 130 can be tightened down on the upper alignment struts 150, for example by tightening the cover bolts 174, which wedges the distal ends 152 of the alignment struts 150 tightly into the wedge-shaped recesses. In this way, the pad holder 146 may be clamped securely into its operative position in the outlet flange 120 without having to separately screw or bolt in the distal ends 152 of the alignment struts 150.

One or more of the strut receivers 154 of the support ring 148 may define a portion of a socket 168. The socket 168 can ensure that the pad support 146 is aligned in the operative position during installation. In addition, the circumferential sidewalls of the socket 168 prevent the pad holder 146 from rotating axially in the outlet flange 120 when the distal end 152 of one of the alignment struts 150 is operatively installed therein. In this arrangement, the lowermost strut receiver 154 has a socket 168 recessed into a rear axial wall 170 of the strut receiver. In contrast, the remaining strut receivers 154 of the support ring 148 do not form the socket 168, but rather, have a flat rear axial wall 170. However, more of the strut receivers 154 may also form a socket 168 if desired. Similarly, the strut receivers 154 formed on the interior surface of the port cover 130 may be in the form of one or more individual sockets having circumferential sidewalls or may be in the form of a circumferential groove extending along the inner circumferential surface of the port cover 130. Providing only one socket 168 formed by the support ring 148, or possibly with a second socket formed by the port cover 130, may be sufficient to align and/or rotationally restrain the pad holder 146 from unwanted rotation within the outlet flange 120. Forming the remaining strut receivers 154 with one or more circumferential grooves, which do not have socket sidewalls, may make it easier to install the pad holder 146 and the port cover 130 in the operative position. However, the strut receivers 154 may not require inclusion of a socket 168, in particular in view of the wedging action of the alignment struts 150 in the strut receivers 154, and/or more or all of the strut receivers 14 may form a socket 168.

Referring again to FIGS. 8 and 13, a method of removing and/or operatively installing the valve seat assembly 106 within the outlet flange 120 when the outlet flange 120 is operatively installed in line between the outlet cover 118 of the actuator portion and a pipe flange (not shown) can include generally the steps of removing the port cover 130 to open the lateral access port 102, removing and/or installing the valve seat assembly 106 through the lateral access port 102, and reattaching the port cover 130 to close the lateral access port 102. For example, a lifting lug 180 may be threaded into a threaded bore in the top of the port cover 130 and the cover bolts 174 can be removed. A lift, such as a crane or winch, may be attached to the lifting lug 180 and the port cover 130 can be lifted up out of the lateral access port 102, thereby exposing the valve seat assembly 106 through the opening defined by the lateral access port through the radial side wall of the outlet flange 120. Next, the pad holder 146 is urged upwardly out of the strut receivers 154 along the lower half of the outlet flange and the lower portion 162 of the support ring 148. The top end of the pad holder 146 may then be tilted rearwardly so that the pad holder 146 and the valve pad 140 can slide out through the opening of the lateral access port 102. Once outside of the outlet flange 120, the valve seat assembly 106 can be easily worked on, for example, replacing the valve pad 140 or other maintenance. To operatively install the valve seat assembly 106, with the support ring 148 bolted into its operative position inside the outlet flange 120, the pad holder 146 (along with a valve pad 140 attached with a fastener 144) is slid down into the interior of the outlet flange 120 through the opening of the lateral access port 102, with the valve pad 140 facing forward toward the valve sleeve 122. The lower alignment struts 150 are tilted forward so that the distal ends 152 of the lower alignment struts 150 are aligned with the strut receivers 154 formed between the lower portion 162 of the support ring 148 and the radial wall or walls 172 on the interior surface of the outlet flange 120. The distal ends 152 are then urged downwardly into respective lower strut receivers 154 while tilting the upper portion of the pad holder 146 forward, which thereby also aligns the alignment struts 150 into the operative transverse plane inside the outlet flange 120. Thereafter, optionally the seal 132 is installed, and the port cover 130 is inserted into the opening of the lateral access port 102 with the strut receivers 154 aligned with the distal ends 152 of the upper alignment struts 150. To close the lateral access port, the port cover 130 is then secured and tighten down with the cover bolts 174. In the process of tightening the port cover 130 to the outlet flange 102, the port cover 130 wedges the distal ends 152 of the alignment struts 150 tightly into the wedge-shaped recesses formed by the tapered rear axial walls 170 of the strut receivers 154.

In this process, the support ring 148 is not removed from its installed position around the interior circumference of the outlet flange 120. In some arrangements, if the support ring 148 needs to be removed and/or reinstalled, the outlet flange 120 may need to be removed from the outlet cover 118 in order to provide access to the fastener bolts and/or to remove the support ring 148 out the end of the outlet flange 120. However, in some arrangements, the opening formed by the lateral access port 102 may be large enough that the support ring 148 could be also removed out through the lateral access port 102 and/or the fastener bolts that attach the support ring 148 to the interior surface of the outlet flange 120 may also be accessed through the lateral access port 102. Of course, other methods and/or arrangements of steps may be performed to remove and/or install the valve seat assembly 106.

The port cover 130 in FIGS. 9-11 is slightly different than the port cover 130 shown in FIGS. 5-8 in that the pattern of the bolt holes for the cover bolts 174 is slightly different. In particular, in the port cover 130 of FIGS. 9-11, the two circumferentially center bolts are aligned on the angularly central axis of the port cover 130. This may make it easier to tighten the port cover 130 and the valve seat assembly 106 in a more balanced manner, for example, by initially tightening the two angularly central bolts first, and then tightening the remaining bolts thereafter. A corresponding modification to the bolt holes in the outlet flange 120 would also be provided. Otherwise, the port covers 130 are substantially identical on the interior sides thereof for interaction with the valve seat assembly 106.

Figure 16:
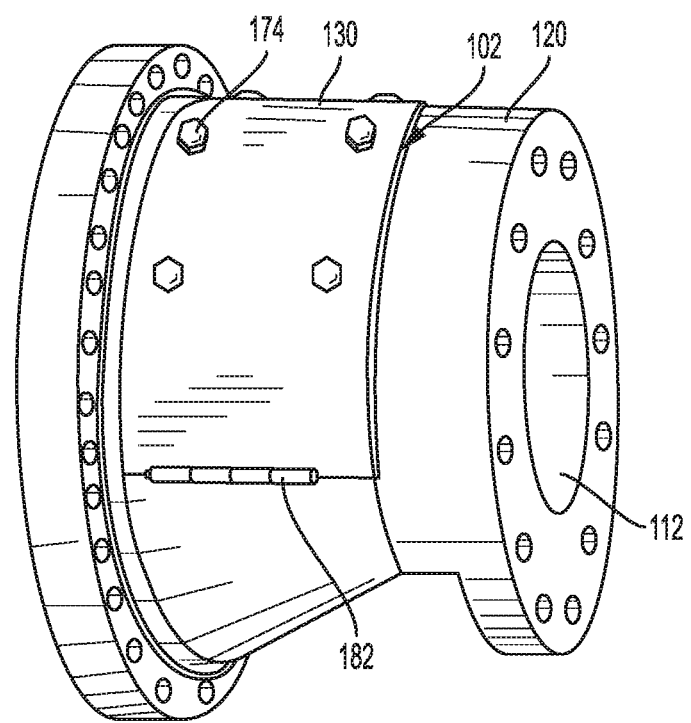
FIG. 16 is a perspective view of an outlet flange similar to FIG. 11, but with a hinge connection between the port cover and the body of the lateral access port.

FIG. 16 shows an optional variation, in which the port cover 130 is coupled to the outlet flange 120 with a hinge 182. In this arrangement, instead of completely removing the port cover 130 from the outlet flange 120 when opening the lateral access port 102, the port cover 130 would simply be opened and/or closed by rotating the port cover 130 around the hinge. The remaining portions of the flow regulator may be substantially the same as described previously. This arrangement may be particularly suitable for smaller size regulators that are easily manipulated by workers without the need to use cranes and/or winches to lift the parts.

This detailed description is to be construed as examples only and does not describe every possible embodiment, as describing every possible embodiment would be impractical, if not impossible. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

The invention claimed is:

1. A valve seat assembly for use in a fluid control valve, comprising:
a pad holder, the pad holder including a support body configured to support a seat pad and a plurality of alignment struts projecting radially outwardly from the support body; and
a support ring adapted to be installed within a valve body of the fluid control valve, the support ring extending around the radially outer perimeter of the alignment struts,
wherein the pad holder slides into and out of an operative position in the support ring, and
wherein the support body has an end face configured to support the seat pad and an opposite end, the plurality of alignment struts project radially outwardly from the opposite end of the pad support body, and distal ends of the respective alignment struts are configured to be slidingly received within and removed from corresponding strut receivers.

2. The valve seat assembly of claim 1, wherein the distal ends of the alignment struts are not interconnected by an integral outer support ring.

3. The valve seat assembly of claim 1, wherein the support ring includes a strut receiver, and wherein a distal end of one of the alignment struts is slidably received within the strut receiver in the operative position in the support ring.

4. The valve seat assembly of claim 3, wherein the support ring forms an axially cutaway portion radially opposite the strut receiver, and wherein the pad holder slides through the axially cutaway portion into and out of the operative position in the support ring.

5. The valve seat assembly of claim 1, wherein the alignment struts define a plurality of flow-through passages extending through the valve seat assembly between the support ring and the support body of the pad holder.

6. The valve seat assembly of claim 1, wherein the support ring comprises:
an upper portion and a lower portion;
a strut receiver disposed on a radially inner surface of the lower portion;
a cutaway portion defined by the upper portion, wherein the cutaway portion is radially opposite the strut receiver.

7. The valve seat assembly of claim 6, further comprising a front face and a rear face, wherein the front face is disposed in a single radial plane, wherein the rear face has a stepped configuration between the upper portion and the lower portion, and wherein the upper portion has a first thickness between the front face and the rear face, the lower portion has a second thickness between the front face and the rear face, and the second thickness of the lower portion is greater than the first thickness of the upper portion.

8. The valve seat assembly of claim 6, wherein the cutaway portion is in a same radial plane as the strut receiver.

9. The valve seat assembly of claim 6, further comprising at least a second strut receiver disposed on the radially inner surface of the lower portion.

10. The valve seat assembly of claim 6, wherein the strut receiver comprises a rear axial wall, wherein the rear axial wall is tapered to form a wedge-shaped receiver cavity for a distal end of an alignment strut.

11. A fluid control valve comprising:
a valve body that defines a fluid flow path extending along an axis through the valve body from an inlet to an outlet;
a valve seat assembly, comprising:
a pad holder, the pad holder including a support body configured to support a seat pad and a plurality of alignment struts projecting radially outwardly from the support body; and
a support ring extending around the radially outer perimeter of the alignment struts,
wherein the pad holder slides into and out of an operative position in the support ring, and
wherein the valve seat assembly is operatively installed in the fluid flow path to control the flow of fluid through the fluid flow path; and
a lateral access port extends through a radial wall of the valve body radially aligned with at least a portion of the valve seat assembly.

12. A pad holder for a valve seat assembly for use in a fluid control valve, the pad holder comprising:
a pad support body having an end face configured to support a valve pad and an opposite end;
a plurality of alignment struts projecting radially outwardly from the opposite end of the pad support body,
wherein distal ends of the respective alignment struts are configured to be slidingly received within and removed from corresponding strut receivers.

13. The pad holder of claim 12, wherein the distal ends of the alignment struts are not interconnected by an integral outer support ring.

14. A support ring for a valve seat assembly for use in a fluid control valve, the support ring comprising:
an upper portion and a lower portion;
a strut receiver disposed on a radially inner surface of the lower portion;

a cutaway portion defined by the upper portion, wherein the cutaway portion is radially opposite the strut receiver.

15. The support ring of claim 14, further comprising a front face and a rear face, wherein the front face is disposed in a single radial plane, wherein the rear face has a stepped configuration between the upper portion and the lower portion, and wherein the upper portion has a first thickness between the front face and the rear face, the lower portion has a second thickness between the front face and the rear face, and the second thickness of the lower portion is greater than the first thickness of the upper portion.

16. The support ring of claim 14, wherein the cutaway portion is in a same radial plane as the strut receiver.

17. The support ring of claim 14, further comprising at least a second strut receiver disposed on the radially inner surface of the lower portion.

18. The support ring of claim 14, wherein the strut receiver comprises a rear axial wall, wherein the rear axial wall is tapered to form a wedge-shaped receiver cavity for a distal end of an alignment strut.

\* \* \* \* \*

UNITED STATES PATENT AND TRADEMARK OFFICE
CERTIFICATE OF CORRECTION

PATENT NO. : 10,920,896 B2
APPLICATION NO. : 16/055930
DATED : February 16, 2021
INVENTOR(S) : James L. Griffin, Jr. et al.

It is certified that error appears in the above-identified patent and that said Letters Patent is hereby corrected as shown below:

In the Specification

At Column 1, Line 34, "outlet cover 20" should be -- outlet cover 22 --.

At Column 3, Line 1, "Any" should be -- any --.

At Column 3, Line 13, "art; and" should be -- art; --.

At Column 5, Line 41, "and" should be -- an --.

At Column 5, Line 44, "outlet flange 56." should be -- outlet flange 60. --.

At Column 6, Line 64, "in" should be -- an --.

At Column 7, Line 52, "and" should be -- an --.

At Column 9, Line 62, "strut receivers 14" should be -- strut receivers 154 --.

At Column 10, Lines 44-45, "outlet flange 102," should be -- outlet flange 120, --.

Signed and Sealed this
Fifth Day of July, 2022

Katherine Kelly Vidal
*Director of the United States Patent and Trademark Office*